(12) United States Patent
Venkatesan et al.

(10) Patent No.: US 7,502,776 B2
(45) Date of Patent: Mar. 10, 2009

(54) DYNAMIC CONNECTION ESTABLISHMENT USING AN OBJECT LINK

(75) Inventors: Ramkumar Venkatesan, Mountain View, CA (US); Lakshminarayanan Chidambaran, Sunnyvale, CA (US)

(73) Assignee: Oracle International Corporation, Redwood Shores, CA (US)

(*) Notice: Subject to any disclaimer, the term of this patent is extended or adjusted under 35 U.S.C. 154(b) by 309 days.

(21) Appl. No.: 11/292,804

(22) Filed: Dec. 1, 2005

(65) Prior Publication Data

US 2007/0130154 A1    Jun. 7, 2007

(51) Int. Cl.
    *G06F 17/30* (2006.01)
(52) U.S. Cl. .............. 707/2; 707/1; 707/3; 707/6; 707/10; 707/100
(58) Field of Classification Search ............... 707/1–3, 707/6, 10, 100; 709/227–229
    See application file for complete search history.

(56) References Cited

U.S. PATENT DOCUMENTS

2005/0120292 A1* 6/2005 Suzuki .................. 715/501.1
2006/0149797 A1* 7/2006 Chai et al. ............... 707/204

OTHER PUBLICATIONS

Author Unknown, "Description of EDCS Technology Clusters", ACM SIGSOFT Software Engineering Notes, vol. 22, No. 5, Sep. 1997, pp. 33-42, ACM Press USA.

Anick, P., "Addressing the Requirements of a Dynamic Corporate Textual Information Base", Proceedings of the 14th Annual International ACM SIGIR Conference on Research and Development in Information Retrieval, Sep. 1991, pp. 163-172, AMC Press USA.
Baresi, L., "Graph Transformation to Infer Schemata from XML Documents", Proceedings of the 2005 ACM Symposium on Applied Computing SAC '05, Mar. 2005, pp. 642-646, ACM Press USA.
Baresi, L., "Modeling and Validation of Service-Oriented Architectures: Application vs. Style", ACM-SIGSOFT Software Engineering Notes, Proceedings of the 9th European Software Engineering Conference Held Jointly with 11th ACM SIGSOFT International Symposium on Foundations of Software Engineering ESEC/FSE-11, vol. 28, No. 5, Sep. 2003, pp. 68-77, ACM Press USA.

(Continued)

*Primary Examiner*—Cam-Linh Nguyen
(74) *Attorney, Agent, or Firm*—Vista IP Law Group, LLP.

(57) ABSTRACT

Techniques are provided for creating dynamic connections to objects on remote database clusters. Service-to-instance mapping information is provided to a listener process for a cluster database. The service-to-instance mapping indicates the current provider instance(s) of each object within the cluster database. To establish a connection to a remote object, a sending process uses an object link. The object link identifies the desired destination object, but not the provider instance of the object. The object link also contains a authentication information and other connection information that exists in regular database links. The global listener for the cluster database uses the service-to-instance mapping to determine which instance is the current provider of the specified object, and dynamically distinguishes the appropriate database instance as the endpoint of the connection.

27 Claims, 6 Drawing Sheets

OTHER PUBLICATIONS

Bergstraesser, T., "*Versions and Workspaces in Microsoft Repository*", ACM SIGMOD Record, Proceedings of the 1999 ACM SIGMOD International Conference on Management of Data SIGMOD '99, vol. 28, No. 2, Jun. 1999, pp. 532-533, ACM Press USA.

Boudier, G., "*An Overview of PCTE and PCTE+*", ACM SIGSOFT Software Engineering Notes, ACM SIGPLAN Notices, Proceedings of the Third ACM SIGSOFT/SIGPLAN Software Engineering Symposium on Practical Software Development Environments SDE 3, vol. 13, 24 Issue 5, 2, Nov. 1988, pp. 248-257, ACM Press USA.

Bouvin, N., "*Fluid Annotations Through Open Hypermedia: Using and Extending Emerging Web Standards*", Proceedings of the 11th International Conference on World Wide Web, May 2002, pp. 160-171, AMC Press USA.

Brown, L., "*A Survey of Image Registration Techniques*", ACM Computing Surveys (CSUR), vol. 24, No. 4, Dec. 1992, pp. 325-376, ACM Press USA.

Bukowski, R. et al., "*Object Associations: A Simple and Practical Approach to Virtual 3D Manipulation*", Proceedings of the 1995 Symposium on Interactive 3D Graphics, Apr. 1995, pp. 131-138, and 214, ACM Press USA.

Caloini, A., "*Matching Hypertext Models to Hypertext Systems: a Compilative Approach*", Proceedings of the ACM Conference on Applied Computing, Dec. 1992, pp. 91-101, ACM Press USA.

Carey, M., "*Shoring Up Persistent Applications*", SIGMOD '94, pp. 383-394, May 1994, ACM Press USA.

Celentano, A., "*Schema Modelling for Automatic Generation of Multimedia Presentations*", Proceedings of the 14th International Conference on Software Engineering and Knowledge Engineering SEKE '02, Jul. 2002, pp. 593-600, ACM Press USA.

Clifton, C. et al., "*HyperFile: A Data and Query Model for Documents*", VLDB Journal, vol. 4, 1995, pp. 45-86, VLDB USA.

Cobb, E., "*The Impact of Object Technology on Commercial Transaction Processing*", The VLDB Journal, vol. 6, 1997, pp. 173-190, Springer-Verlag USA.

Davulcu, H., et al., "*A Layered Architecture for Querying Dynamic Web Content*", SIGMOD '99, Philadelphia, PA, 1999, pp. 491-502, ACM Press USA.

Delisle, N. et al., "*Contexts—A Partitioning Concept for Hypertext*", ACM Transactions on Office Information Systems, vol. 5, No. 2, Apr. 1987, pp. 168-186, ACM Press USA.

Farrell, R., "*Dynamic Assembly of Learning Objects*", WWW 2004, May 2004, pp. 162-169, ACM Press USA.

Freire, J., "*WebViews: Accessing Personalized Web Content and Services*", Proceedings of the 10th International Conference on World Wide Web, Apr. 2001, pp. 576-586, ACM Press USA.

Gallo, T., "*ObNet: an Object-oriented Approach for Supporting Large, Long-lived, Highly Configurable Systems*", Proceedings of the 11th International Conference on Software Engineering, May 1989, pp. 138-144, ACM Press USA.

Giddings, V., "*Distributed Systems Using Corba and ADA*", ACM SIGAda Ada Letters, vol. XVI, No. 5, Sep. 1996, pp. 59-69, ACM Press USA.

Hope, M., "*Improving Co-Operative Working in the Utility Industry Through Mobile Context Aware Geographic Information Systems*", 8th ACM Symposium on GIS, Nov. 2000, pp. 135-140, ACM Press USA.

Jackson, D., "*Alloy: A Lightweight Object Modelling Notation*", ACM Transactions on Software Engineering and Methodology, vol. 11, No. 2, Apr. 2002, pp. 256-290, ACM Press USA.

Kim, J. et al., "*Memory System Behavior of Java Programs: Methodology and Analysis*", ACM SIGMETRICS Performance Evaluation Review, Proceedings of the 2000 ACM SIGMETRICS International Conference on Measurement and Modeling of Computer Systems SIGMETRICS '00, vol. 28, No. 1, Jun. 2000, pp. 264-274, ACM Press USA.

King, R. et al., "*Bayan: An Arabic Text Database Management System*", Proceedings of the 1990 ACM SIGMOD International Conference on Management of Data, May 1990, vol. 19, Issue 2, pp. 12-23, ACM Press USA.

Kozaczynski, W. et al., "*Concern-Driven Design for a Specification Lanquage Supporting Component-Based Software Engineering*", Proceedings of the 8th International Workshop on Software Specification and Design, Mar. 1996, pp. 150-154, IEEE Computer Society.

Krahl, D., "*Extend: An Interactive Simulation Tool*", Proceedings of the 35th Conference on Winter Simulation: Driving Innovation, Dec. 2003, pp. 188-196, IEEE Computer Society.

Krahl, D. "*Extend: The Extend Simulation Environment*", Proceedings of the 33rd Conference on Winter Simulation, (Dec. 2002) pp. 205-213, IEEE Computer Society.

Krahl, D., "*Extend: The Extend Simulation Environment*", Proceedings of the 34th Confernce on Winter Simulation: Exploring New Frontiers, pp. 217-225, Apr. 1997, Winter Simulation Conference.

Lee, Y. et al., "*Towards Interoperable Heterogeneous Information Systems: An Experiment Using the DIOM Approach*", Proceedings of the 1997 ACM Symposium on Applied Computing, Apr. 1997, pp. 112-114, ACM Press USA.

Liu, L. et al., "*The Distributed Interoperable Object Model and Its Application to Large-Scale Interoperable Database Systems*", CIKM '95, Baltimore, MD USA, 1995, pp. 105-112, ACM Press USA.

Meijler, T. et al., "*Making Design Patterns Explicit in FACE: a Framework Adaptive Composition Environment*", ACM SIGSOFT Software Engineering Notes, Proceedings of the 6th European Conference Held Jointly With the 5th ACM SIGSOFT International Symposium on Foundations of Software Engineering ESEC '97/FSE-5, vol. 22, No. 6, Nov. 1997, pp. 94-110, Springer-Verlag, New York Inc. and ACM Press, Inc. USA.

Meyer, A., "*Pen Computing: a Technology Overview and a Vision*", ACM SIGCHI Bulletin, vol. 27, No. 3, Jul. 1995, pp. 46-90, ACM Press USA.

Mobasher, B., "*Automatic Personalization Based on Web Usage Mining*", Communication of the ACM, vol. 43, No. 8, Aug. 2000, pp. 142-151, ACM Press USA.

Neville, J. et al., "*Using Relational Knowledge Discovery to Prevent Securities Fraud*", Proceeding of the Eleventh ACM SIGKDD International Conference on Knowledge Discovery in Data Mining KDD '05, Aug. 2005, pp. 449-458, ACM Press USA.

Nguyen, T., "*The Molhado Hypertext Versioning System*", Proceedings of the Fifteenth ACM Conference on Hypertext and Hypermedia Hypertext '04, Aug. 2004, pp. 185-194, ACM Press USA.

Nie, Z., "*Object-Level Ranking: Bringing Order to Web Objects*", Proceedings of the 14th International Conference on World Wide Web, May 2005, pp. 567-574, ACM Press USA.

Nierstrasz, O., "*Open Systems for Software: An Object-oriented Solution*", OOPSLA '93, Addendum to the Proceedings, Washington DC, Sep.-Oct. 1993, vol. 5, Issue 2, pp. 67-71, ACM Press.

Noik, E., "*Challenges in Graph-Based Relational Data Visualization*", Proceedings of the 1992 Conference of the Centre for Advanced Studies on Collaborative Research, vol. 1., Nov. 1992, pp. 259-277, IBM Press, Canada.

Okuno, H., et al., "*Reuse in the Application Layer*", Proceedings of the 1996 Conference of the Centre for Advanced Studies on Collaborative Research, pp. 1-16, 1996, IBM Press, Canada.

Papazoglou, M. et al., "*A Database Model for Object Dynamics*", The VLDB Journal, No. 6, Issue 2, May 1997, pp. 73-96, Springer-Verlag New York USA.

Pearl, A., "*Sun's Link Service: A Protocol for Open Linking*", Hypertext '89 Proceedings, Nov. 1989, pp. 137-146, ACM Press USA.

Press, L., "*Windows NT as a Personal or Intranet Server*", Communications of the ACM, vol. 39, No. 5, May 1996, pp. 19-23, ACM Press USA.

Sun, C., "*English Stress and Rhythm: A Phonetics Courseware*", ACM SIGCUE Outlook, vol. 26, No. 3, Jul. 1998, pp. 8-15, ACM Press.

Wang, M., "*Web Object Indexing Using Domain Knowledge*", KDD '05, Research Track Paper, Aug. 2005, Chicago, IL. 2005, pp. 294-303, ACM Press USA.

Yang, J. et al., "*Octopus: Aggressive Search of Multi-Modality Data Using Multifaceted Knowledge Base*", Proceedings of the 11th International Conference on World Wide Web, May 2002, pp. 654-64, ACM Press USA.

Vion-Dury, J. et al., "*Virtual Images: Interactive Visualization of Distributed Object-Oriented Systems*", OOPSLA '94, Portland, OR, vol. 29, Issue 10, Oct. 1994, pp. 65-84, ACM Press USA.

* cited by examiner

DYNAMIC CONNECTION ESTABLISHMENT USING AN OBJECT LINK

FIELD OF THE INVENTION

The present invention relates to databases and, more specifically, to providing connections to objects stored on remote databases.

BACKGROUND

Complex database systems often need to access objects stored on remote databases. For example, a bank may need to transmit a financial transaction across several databases in order to maintain integrity in their records. As another example, a shipping company may need to send package tracking information across several systems in order to make this data available to its customers.

A "cluster" is a system in which multiple database servers ("instances") have access to the same database. A database to which the multiple instances have access is referred to herein as a "cluster database." The persistent storage that stores a cluster database is accessible by all instances in the cluster. Typical database objects such as persistent tables, packages and procedures will be accessible from any instance of the cluster database.

In a cluster database, one or more instances of a certain class of objects may be stored on one or more database instances in a private area accessible only to that instance, e.g. in its volatile memory. For example, in a database cluster containing instances I1, I2, and I3, a particular object, O1, may be stored on I1 and I3 in their respective volatile memory, but may not be stored on I2.

Connecting to such objects in a cluster environment presents a unique challenge because the information destined for the particular object in a cluster database does not merely have to be delivered to the right database, but has to be delivered to the right instance (an instance containing the target object). To ensure that information is delivered to the correct database instance, database links could be allocated on an instance-by-instance basis.

Remote access of such objects on different databases happens through database links ("dblinks"). When a dblink is initialized, the user specifies various dblink configuration values, including a specific destination instance for the dblink. For example, a typical dblink configuration may appear as follows:
host=host1.oracle.com
port=300
protocol=TCP
username=fred
password=xyz
service_name=dbs1.oracle.com
instance-name=instance1

This is known as an "instance dependent" dblink, because the destination instance is specified in the dblink.

After the dblink has been set up, the dblink may then be used to establish connections with the specified database instance. Connections are used for information exchange between a source database, and a destination database instance specified by the dblink. After a connection has been established, the processes communicate directly with each other to exchange information to/from the destination object.

Problems can arise when information is accessed from remote objects in a clustered database. For example, an instance in a cluster database system may fail. Upon failure of an instance, which contains a particular object, the object automatically migrates to another live instance. After the migration of a destination object, the propagation of information from sources outside the new provider instance to the migrated object will fail because the connections that had already been established at the time of the migration are to the previous provider instance. Furthermore, attempt to establish new connections will also fail, because the new connection attempts will use a dblink that points to the previous provider-instance.

Correcting the object access problems when a failover occurs requires the database administrator to drop the dblink associated with the failed node and determine the new provider instance of the target object. Once the new provider instance has been determined, the database administer creates a database link to connect to the new provider instance of the destination object. The inherent delay in the re-configuration leads to disruption and unavailability of the migrated objects for a certain time period.

When there are multiple such objects that need to be accessed remotely, the user needs to configure multiple separate instance-specific dblinks, one per object accessed. This will entitle duplication of all the connection and authentication information in several dblinks. Also, in the event that these remote objects are highly transient in nature with a high rate of arrival and departure of these objects, then these dblinks need to be dynamically created and dropped for each of these objects. This has adverse security and manageability consequences.

Based on the foregoing, it is clearly desirable to provide an improved method for connecting to objects residing in cluster databases, which allows access to migrated objects without intervention from a database administrator and greatly improves the security and management of such links

SUMMARY

Techniques are provided for creating dynamic connections to objects on remote database clusters. Service-to-instance mapping information is provided to a listener process for a cluster database. The service-to-instance mapping indicates the current provider instance of each object within the cluster database. To establish a connection to an object, a sending process uses an object link. The object link identifies the desired destination object, but not the provider instance of the object. The object link also contains authentication information and other connection information. The global listener for the cluster database uses the service-to-instance mapping to determine which instance is the current provider of the specified object, and dynamically establishes a connection to a process on the appropriate provider instance of the object.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

EXAMPLE DATABASE CLUSTER

Figure 1:
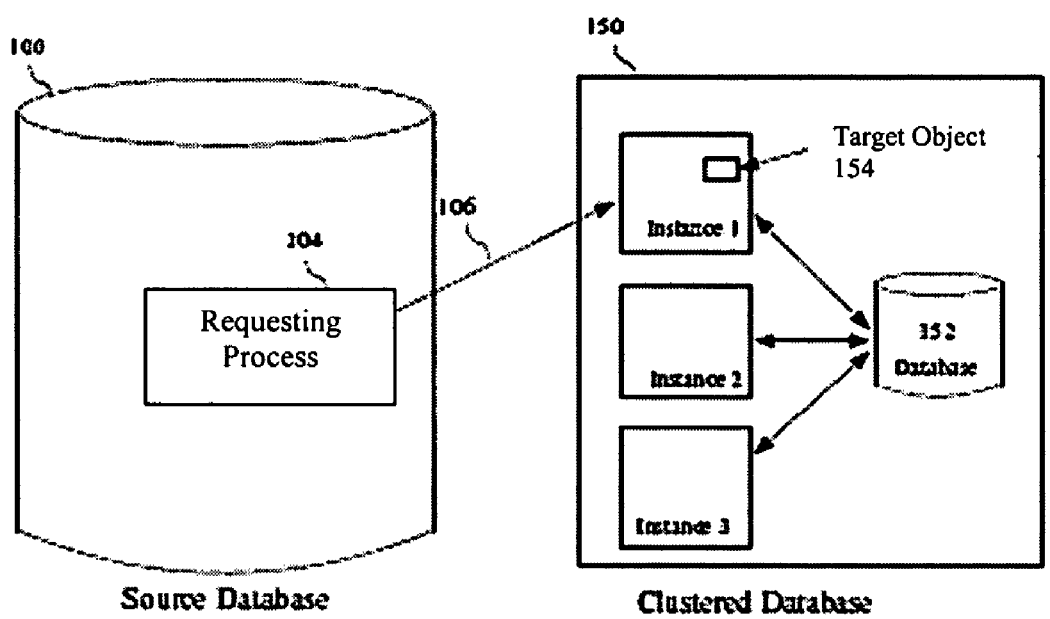
FIG. 1 is a block diagram that illustrates a scenario of accessing information to/from objects in a clustered database system.

FIG. 1 is a block diagram illustrating a scenario of propagating information to objects within a clustered database system. A process 104 is located on a source database 100. Shared data 152 is accessible to multiple instances (instances 1, 2 and 3).

When process 104 wishes to access information of a target object 154, a connection 106 is established to the Instance 1, on which target object 154 is located. In contrast to prior art systems, which used an instance-dependent dblink to establish connection 106, embodiments of the present invention use an object link to establish connection 106. In establishing connection 106, a global listener is used to track the instance on which each object is stored. Details of the object link and the global listener will be discussed further with reference to FIGS. 3-4.

Figure 2:
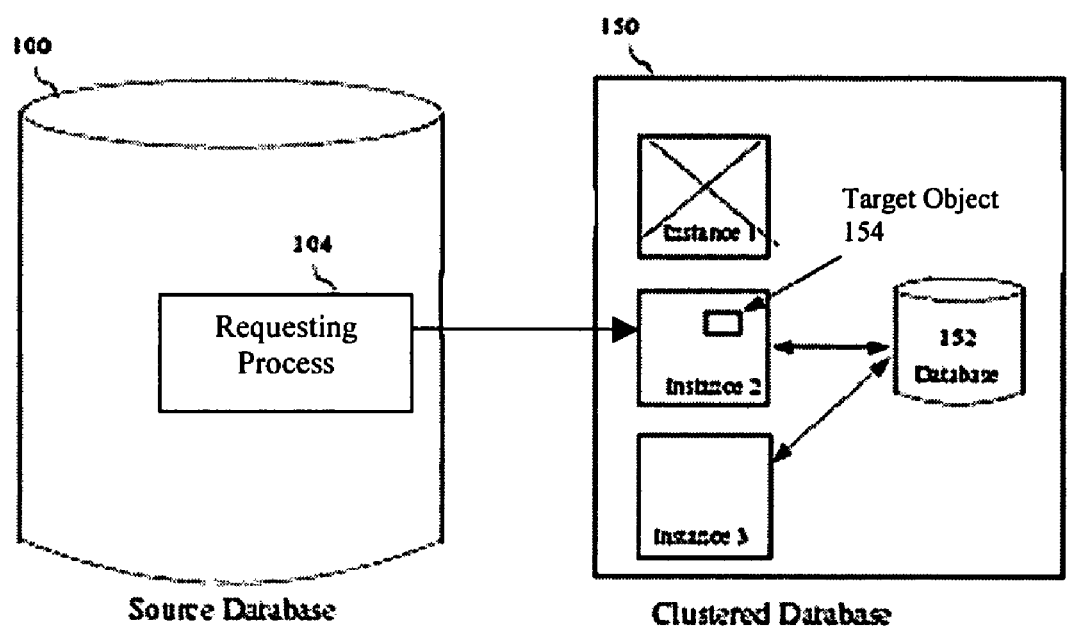
FIG. 2 is a block diagram that illustrates the cluster database system of FIG. 1 after an object has been migrated to another provider instance.

Under various circumstances, an instance in a cluster database system may fail. Upon failure of an instance which contains a particular object, the object automatically migrates to another live instance. For the purpose of illustration, it shall be assumed that database instance 1 has failed, and target object 154 has been migrated to instance 2, as illustrated in FIG. 2.

In prior art systems using instance-dependent dblinks, the remote access of information from the migrated object would fail because connection 106 connected to the previous provider instance, Instance 1. However, using object links and a global listener, connection 106 is re-routed at the time of migration, such that connection 106 points to the new provider instance of target object 154, in this case Instance 2.

Overview

Embodiments of the invention include techniques for providing connections to objects in a cluster database system.

In one embodiment, object-to-instance mapping information is provided to a listener process for a cluster database. The object-to-instance mapping indicates the current provider instance of each object within the cluster database. To establish a remote connection to an object, a remote process uses an object link to send a connection request to the global listener. The object link contains dblink information in addition to object information identifying the desired object. The global listener for the cluster database uses the object-to-instance mapping to determine which instance is the current provider of the specified object. The global listener then establishes a connection between the requesting process and the object provider instance. In the case of a failure, the objects on a failed instance are moved to other instances, and the object-to-instance mapping information is revised to reflect the changes. Attempts to communicate with the migrated objects after the failure are directed to the global listener, not the failed instance. Therefore, the global listener can redirect such requests to the appropriate instance. This allows the global listener to redirect existing connections as well as establish new connections to the migrated objects.

Objects as Services

As mentioned above, an object-to-instance mapping is maintained for determining which instance currently provides an object when a connection to the object is requested. In one embodiment, such a mapping is maintained by registering each object as a service. A system in which objects are registered as services is illustrated in FIG. 3.

Figure 3:
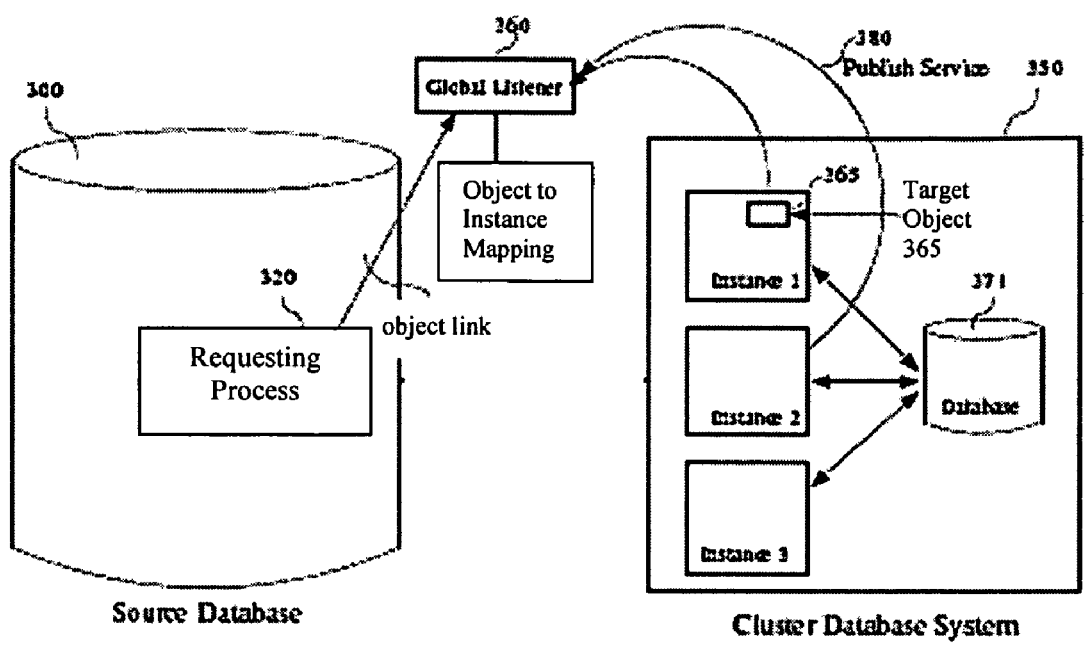
FIG. 3 is a block diagram that illustrates accessing a remote object in a clustered database with multiple database instances, according to an embodiment of the invention.

Referring to FIG. 3, the target objects 154 of a clustered database system 350 are registered as services with a global listener 360. The registration information for an object indicates, among other things, one or more provider instances of the object. If the provider instance(s) of an object change (due to object migration), then the service registration information for the object is changed to reflect the new provider instance.

When a process 320 desires to establish a connection with a destination object, the process 320 uses an object link, containing object information and an instance-independent dblink, to send a service request for the destination object to the global listener 360. The global listener 360 inspects the registered service information, which contains the object-to-instance mapping, to determine which instance(s) are current provider(s) of the specified remote object. Global listener 360 then uses this information to dynamically create the endpoint for the connection specified by the instance-independent dblink.

Figure 3B:
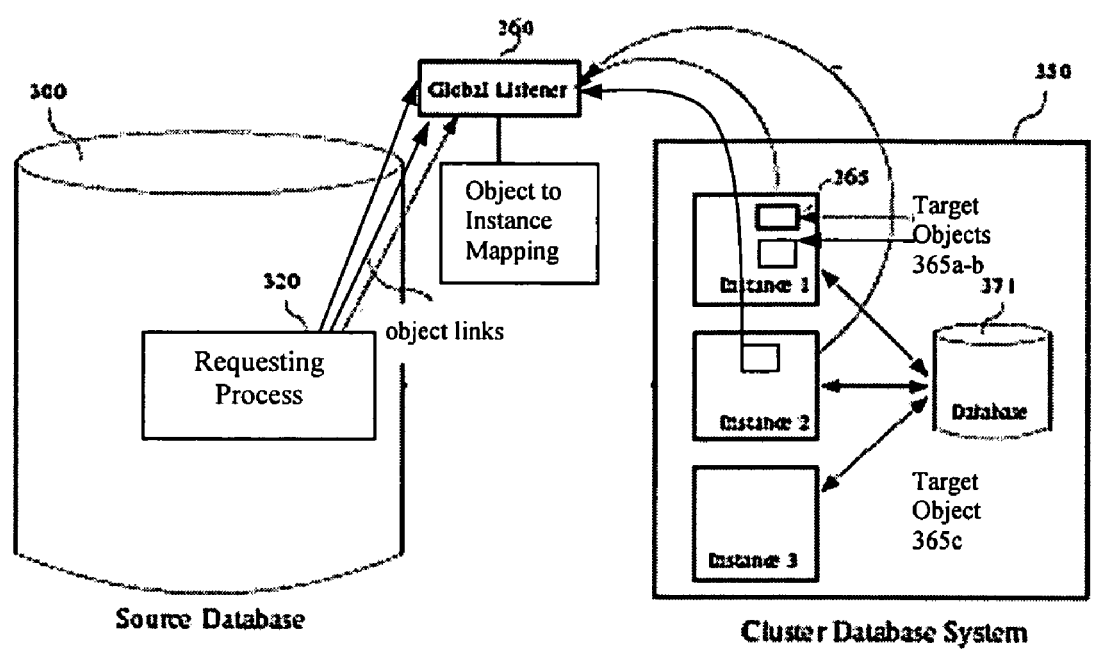
FIG. 3B is a block diagram that illustrates accessing remote objects in a clustered database with multiple database instances, according to an embodiment of the invention.

When modeling objects as services, the user needs to now setup multiple database links, one per object service when multiple remote objects need to be accessed. Such a scenario is illustrated in FIG. 3B. When these objects are transient in nature, the corresponding database links need to be created and dropped dynamically. This is not a scalable solution when the number of objects increases.

Object Links

According to one embodiment, an object link is used to connect to a remote object. The object link contains object information identifying the remote object, and a dblink used to connect to a remote database. The configuration information for a dblink is instance-independent, i.e., no longer identifies a specific instance. Rather, the dblink configuration contains information that (1) identifies the target cluster database, but (2) is not specific to any database instance. For example, the configuration data for an object link may appear as follows:

| Object Info | DBLink |
|---|---|
| object name | host = host1.oracle.com<br>port = 500<br>protocol = TCP<br>username = fred<br>password = xyz<br>service-name = dbs1.oracle.com |

Because the dblink configuration does not tie the dblink to any specific target instance, the dblink may be used to connect to any instances of the cluster database that is identified by the service name of the dblink. The endpoint for the connection may be dynamically calculated using the object information. In this way, a single object link may be used for connection establishment to the cluster database, which allows for communication to the specified object even if it migrates from one instance in the cluster to another.

While the dblink is not tied to any database instance, communication with an object still needs to be made with a specific database instance. Therefore, without additional information, the dblink is not used to directly communicate with the provider instance of the appropriate destination object. Rather, as explained above, the dblink is used to establish and maintain a connection to the desired database cluster. The object information is used to communicate with a global listener that is able to identify the provider instance of the destination object and to dedicate that instance as the endpoint for the dblink connection.

Establishing the Connection

Connection requests that are sent to a cluster database service based on object links are received by a global listener process. Upon receiving a connection request, the global listener process establishes a connection to the database cluster as specified by the dblink. The global listener process parses the object information to identify the destination service. The global listener process then uses the identity of the destination service and the service-to-instance mapping information to identify the database instance that currently owns the specified object. Once the current provider instance of the destination object is identified, the global listener establishes a connection between the requesting process and a process on the current provider instance of the destination object.

For example, in FIG. 3, object link 330 is instance-independent in that the dblink contained therein specifies the cluster database system 350, but not to any particular instance thereof. The connection request to an object is received by the global listener 360, which uses the registered service information to locate the destination object on a destination instance and establish a connection between the process 320 and a receiving process on the appropriate destination instance (instance 1).

OBJECT MIGRATION EXAMPLE

Referring again to FIG. 3, a process 320 within a source database 300 needs to access a target object 365 on the target database 350. The target database system 350 includes several database instances 1, 2 and 3 and shared data 371. Initially, database instance 1 provides target object 365.

A service is registered with global listener 360 for each object. According to one embodiment, the service name for each object includes the name of the object. For example, if target object 365 is named O1, the name given to the service associated with target object 365 will include O1. In order to make the service name globally unique, the global database name is appended to the object name.

Global listener 360 listens for incoming client connection requests. According to one embodiment, the global listener 360 is located separate from the clustered database system so that the global listener 360 can have access to all of the instances of the clustered database system 350. The service name for each object is published 380 to the global listener 360.

Process 320 uses an object link 330 to request a connection to the service associated with target object 365, as described above. Based on the information in the object link, a connection is established by global listener 360 between the process 320 and a process on the provider instance for target object 365, in this case Instance 1. Once the connection is established between the process 320 and a process on instance 1, process 320 may access target object 365.

For a variety of reasons, target object 365 may be migrated, for example, from instance 1 to instance 2. For example, the migration of target object 365 may be performed automatically in response to the failure of instance 1. Even if instance 1 has not failed, target object 365 may be migrated to instance 2 for load balancing purposes. In response to migrating target object 365 to instance 2, new service information for target object 365 is published to global listener 360. The new service information indicates that instance 2 is now a provider instance of target object 365.

Based on the new service information, the global listener 360 will migrate the connection for target object 365 to instance 2. Thus, the process 320 will maintain its connection to target object 365.

Figure 4:
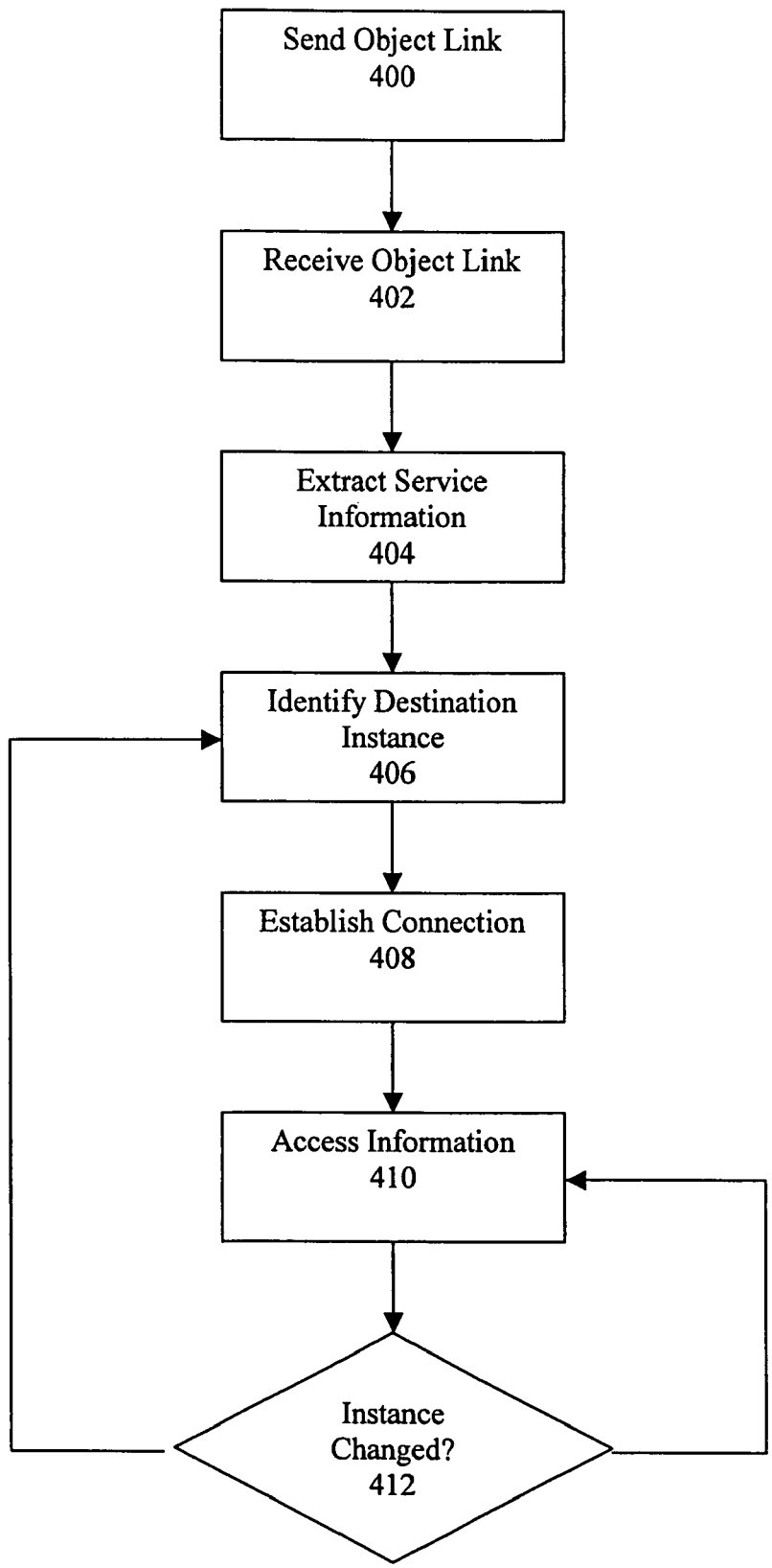
FIG. 4 is a flow chart that illustrates a method for dynamic connection establishment using an object link.

A method for establishing dynamic connections will now be discussed with reference to FIG. 4. As shown in FIG. 4, a process may request a connection using an object link 400. The object link may include, for example, object information specifying the desired object, and a dblink, specifying a target database cluster and providing authentication information.

In step 402, a global listener may receive the request. In step 404, the global listener may extract service information, for example, from object information in the object link. In step 406, the global listener may identify a destination instance. In step 408, the listener may establish a connection between the requesting process and a target process on the destination instance. In step 410, information may be accessed, for example, on the remote object, or information may otherwise be exchanged between the remote processes.

In step 412, it may be determined whether the instance for the object has changed. This may include, for example, determining whether a service-to-instance table has been updated for the service corresponding to the object. If the instance for the object has not changed, the method may return to step 414. If the instance for the object has changed, the method may return to step 406, wherein a new destination instance may be identified.

Applications

Techniques for improving availability of objects in a cluster have been described. In one particular implementation, the objects in the cluster may be queues used for propagating messages. In this case, the invention may be used, for example, to propagate messages to a buffered queue that resides in the volatile memory of one instance of a cluster. However, these same availability-enhancing techniques may be used in contexts that do not involve buffered queue propagation.

Furthermore, while the examples above have shown only a single instance of a particular object, multiple instances of objects may be provided. In this case, multiple instances of an object may be stored on multiple instances of a cluster database. For example, two instances of the same object, $O1_1$ and $O1_2$, may be provided on two database instances, Instance 1 and Instance 2, respectively. If Instance 2 fails, $O1_2$ may be migrated to Instance 3, while $O1_1$ may remain on Instance 1.

When multiple instances of the same object are present, the global listener may perform load-balancing. For example, the global listener may establish or re-route connections to various instances to ensure that all instances are being used relatively equivalently.

Once a connection to an object has been established, data may be transferred to and from the object. In addition, processes or functions of the object may be called, to perform operations on the object, or to perform operations elsewhere on the instance on which the object resides. In one implementation, the technique for calling a process or function at a remote database object may include, for example, transmitting an instruction that includes the object link and the name of the operation to be performed.

System Architecture

Figure 5:
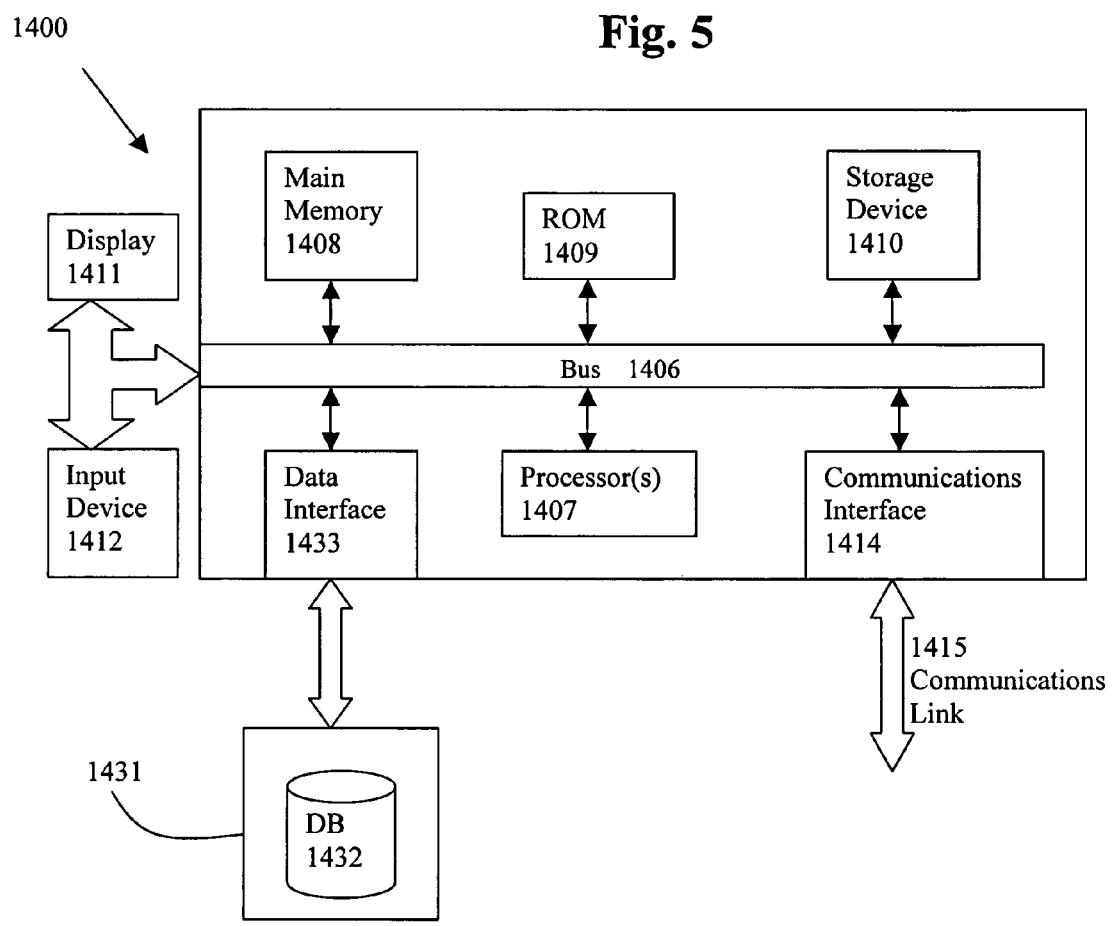
FIG. 5 is a block diagram that illustrates a computer system upon which embodiments of the invention may be implemented.

The execution of the sequences of instructions required to practice the embodiments may be performed by a computer system 1400 as shown in FIG. 5. In an embodiment, execution of the sequences of instructions is performed by a single computer system 1400. According to other embodiments, two or more computer systems 1400 coupled by a communication link 1415 may perform the sequence of instructions in coordination with one another. Although a description of only one computer system 1400 will be presented below, however, it should be understood that any number of computer systems 1400 may be employed to practice the embodiments.

A computer system 1400 according to an embodiment will now be described with reference to FIG. 5, which is a block diagram of the functional components of a computer system 1400. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem, or the communication link 1415 may be the Internet, in which case the communication interface 1414 may be a dial-up, cable or wireless modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions. Thus, embodiments are not limited to any specific combination of hardware circuitry and/or software.

The term "computer-usable medium," as used herein, refers to any medium that provides information or is usable by the processor(s) 1407. Such a medium may take many forms, including, but not limited to, non-volatile and volatile media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Logic refers to software, hardware or any combination of software and hardware.

In the foregoing specification, the embodiments have been described with reference to specific elements thereof. It will, however, be evident that various modifications and changes may be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

What is claimed is:

1. A method for providing a connection between a source database and a target database, comprising:

receiving a connection request from a source database, the connection request comprising an object link, the object link comprising object information specifying a target object and further comprising database information specifying a target database, wherein the target database constitutes a cluster database;

using object-to-instance mapping information to identify a specific target database instance located in a cluster for the target database, the target database instance containing an instance of the target object, and the specific target database instance being identified from the cluster which comprises a plurality of target database instances each of which comprises an instance of the same target database; and establishing a connection between the source database and the specific target database instance, wherein the connection request does not specify the specific target database instance in the cluster to establish the connection.

2. The method of claim 1, wherein the object information comprises:
the name of the target object.

3. The method of claim 1, wherein the database information comprises:
the name of the target database.

4. The method of claim 1, wherein the object link further comprises:
authentication information.

5. The method of claim 1, wherein the object-to-instance mapping information comprises service-to-instance mapping information.

6. The method of claim 1, wherein the specific target database instance is the sole database instance in the target database containing the target object or an instance of the target object.

7. The method of claim 1, wherein the specific target database instance is one of the plurality of target database instances of the target database containing the target object.

8. The method of claim 1, further comprising:
determining whether the instance of the target object is no longer available on the specific target database instance.

9. The method of claim 8, wherein determining whether the instance of the target object is no longer available comprises:
determining whether the object-to-instance mapping information for the target object has changed.

10. The method of claim 8, further comprising:
if the instance of the target object is no longer available on the specific target database instance, using the object-to-instance mapping information to identify a second specific target database instance located in the cluster, the second specific target database instance containing an instance of the target object.

11. The method of claim 10, further comprising:
establishing a connection between the source database and the second specific target database instance.

12. The method of claim 1, wherein the instance of the target object is stored in a private area in the specific target database instance and is accessible only by the specific target database instance.

13. The method of claim 1, further comprising:
identifying second specific target database instance located in the cluster using the object-to-instance mapping information, wherein
the second target database instance containing an instance of the target object, and
the first specific target database instance fails.

14. A method for accessing information on a target database instance, comprising:
sending a connection request to a global listener, wherein
the connection request comprises an object link,
the object link comprises object information specifying a target object and further comprising database information specifying a target database,
the target database constitutes a cluster database, and
the connection request does not specify a specific target database instance for the connection request; and
sending and/or receiving information to/from the specific target database instance via a connection, wherein
the specific target database instance contains an instance of the target object and belongs to a cluster for the target database,
the cluster comprises a plurality of target database instances each of which comprises an instance of the same target database, and
the connection is established by the global listener.

15. The method of claim 14, wherein the global listener identifies the specific target database instance based on object-to-instance mapping information and uses an identity of the specific target database instance to establish the connection.

16. The method of claim 15, further comprising:
if the instance of the target object is no longer available on the specific target database instance, sending information to a second specific target database instance of the plurality of target database instances in the cluster via a second connection, the second specific target database instance containing an instance of the target object, the second connection being established by the global listener.

17. The method of claim 16, wherein the global listener identifies the second specific target database instance based on changed data in the object-to-instance mapping information.

18. The method of claim 17, wherein the global listener uses an identity of the second target database instance to establish the second connection.

19. The method of claim 14, wherein the object information comprises:
the name of the target object.

20. The method of claim 14, wherein the database information comprises:
the name of the target database.

21. The method of claim 14, wherein the object link further comprises:
authentication information.

22. The method of claim 14, wherein the instance of the target object is stored in a private area in the specific target database instance and is accessible only by the specific target database instance.

23. The method of claim 14, further comprising:
sending or receiving information to or from a second specific target database instance located on the cluster, wherein
the second target database instance contains an instance of the target object, and
the first specific target database instance fails.

24. A system for providing a connection between a source database and a target database, comprising:
means for receiving a connection request from a source database, the connection request comprising an object link, the object link comprising object information specifying a target object and further comprising database information specifying a target database, wherein the target database constitutes a cluster database;
means for using object-to-instance mapping information to identify a specific target database instance located in a cluster for the target database, wherein
the means for using the object-to-instance mapping comprises a processor,
the target database instance containing an instance of the target object, and the specific target database instance being identified from the cluster which comprises a plurality of target database instances each of which comprises an instance of the same target database; and establishing a connection between the source database and the specific target database instance, wherein the connection request does not specify the specific target database instance in the duster to establish the connection.

25. A computer readable medium storing a computer software program including instructions which, when executed by a computer processing system, cause the system to perform a method for providing a connection between a source database and a target database comprising:

receiving a connection request from a source database, the connection request comprising an object link, the object link comprising object information specifying a target object and further comprising database information specifying a target database, wherein the target database constitutes a cluster database;

using object-to-instance mapping information to identify a specific target database instance located in a cluster for the target database, the target database instance containing an instance of the target object, and the specific target database instance being identified from the cluster which comprises a plurality of target database instances each of which comprises an instance of the same target database; and establishing a connection between the source database and the specific target database instance, wherein the connection request does not specify the specific target database instance in the cluster to establish the connection.

26. A system for accessing information on a target database instance, comprising:

means for sending a connection request to a global listener, wherein the connection request comprises an object link, the object link comprises object information specifying a target object and further comprising a database information specifying a target database, the target database constitutes a cluster database, and the connection request does not specify a specific target database instance for the connection request; and means for sending and/or receiving information to/from the specific target database instance via a connection, wherein the specific target database instance contains an instance of the target object and belongs to a cluster for the target database, the cluster comprises a plurality of target database instances each of which comprises an instance of the same target database, and the connection is established by the global listener.

27. A computer readable medium storing a computer software program including instructions which, when executed a computer processing system, cause the system to perform a method for accessing information on a target database instance, comprising:

sending connection request to a global listener, wherein the connection request comprises an object link, the object link comprises object information specifying a target object and further comprising database information specifying a target database, the target database constitutes a cluster database, and the connection request does not specify a specific target database instance for the connection request; and sending and/or receiving information to/from the specific target database instance via a connection, wherein the specific target database instance contains an instance of the target object and belongs to a cluster for the target database, the cluster comprises a plurality of target database instances each of which comprises an instance of the same target database; and the connection is established by the global listener.

* * * * *

UNITED STATES PATENT AND TRADEMARK OFFICE
CERTIFICATE OF CORRECTION

PATENT NO. : 7,502,776 B2  Page 1 of 1
APPLICATION NO. : 11/292804
DATED : March 10, 2009
INVENTOR(S) : Venkatesan et al.

It is certified that error appears in the above-identified patent and that said Letters Patent is hereby corrected as shown below:

On page 2, in column 2, under "Other Publications", line 2, delete "Lanquage" and insert -- Language --, therefor.

On page 2, in column 2, under "Other Publications", line 12, delete "Confernce" and insert -- Conference --, therefor.

On page 3, in column 1, under "Other Publications", line 3, delete "654" and insert -- 54 --, therefor.

In column 2, line 34, after "links" insert -- . --.

In column 9, line 54, in claim 13, after "identifying" insert -- a --.

In column 11, line 8, in claim 24, delete "duster" and insert -- cluster --, therefor.

In column 11, line 13, in claim 25, delete "database" and insert -- database, --, therefor.

In column 11, line 38, in claim 26, before "database" delete "a".

In column 12, line 16, in claim 27, before "a" insert -- by --.

In column 12, line 20, in claim 27, after "sending" insert -- a --.

In column 12, line 36, in claim 27, delete "database;" and insert -- database, --, therefor.

Signed and Sealed this

Eighteenth Day of May, 2010

David J. Kappos
*Director of the United States Patent and Trademark Office*